Oct. 29, 1963 D. RICHMAN 3,109,056

TRANSMITTER APPARATUS FOR COMPENSATING FOR RECEIVER SIGNAL DISTORTION

Original Filed Jan. 24, 1957 3 Sheets-Sheet 1

United States Patent Office 3,109,056

Patented Oct. 29, 1963

3,109,056
TRANSMITTER APPARATUS FOR COMPENSATING FOR RECEIVER SIGNAL DISTORTION

Donald Richman, Fresh Meadows, N.Y., assignor to Hazeltine Research, Inc., Chicago, Ill., a corporation of Illinois Continuation of application Ser. No. 636,199, Jan. 24, 1957. This application Mar. 10, 1961, Ser. No. 94,942
18 Claims. (Cl. 178—5.2)

*General*

This invention relates to color-television apparatus and particularly to signal-precorrecting apparatus for modifying the present-day color-television signals to improve the quality of the reproduced image on both color and black-and-white television receivers. While the invention will be described in the television environment it is obvious that its application is not limited thereto but rather the invention has application in any communications system wherein a main signal and a frequency-multiplexed second signal are transmitted and cross talk between the two results in the receiver.

This application is a continuation of application Serial No. 636,199, filed January 24, 1957, and entitled "Transmitter Apparatus for Compensating for Receiver Signal Distortion."

In accordance with the color-television signal standard approved by the Federal Communications Commission, the signal transmitted by a color-television transmitter includes a monochrome-signal portion and a frequency interleaved color-signal portion. The technique of frequency interleaving the signals permits the complete color signal to be transmitted within a specified band width. As is known, such technique is based on the theory that the frequency composition of a periodic signal such as the monochrome portion of a television signal is in the nature of clusters or bunches of periodically spaced side bands, the clusters being spaced apart by frequency intervals corresponding to the line-scanning frequency. As a result the color-signal portion which is also composed of frequency spaced clusters of side bands because it likewise is periodic in nature, may be interleaved with the monochrome signal by arranging that the color-signal clusters fall within the relatively vacant frequency intervals in-between the monochrome-signal clusters. Such a result is obtained by having the color-signal clusters occur at frequencies corresponding to odd harmonics of one-half the line-scanning frequency.

When such a freqeuncy interleaved color signal is reproduced by a black-and-white television receiver, the color-signal portion is in principle not visible to the human eye and, hence, such receiver appears to reproduce the usual black-and-white or monochrome image in response to the monochrome portion of the signal. The low visibility of the color-signal portion depends on the components of such signal portion being at odd harmonics of one-half the line-scan frequency. As a result, such odd-harmonic components will have one polarity in the first picture and the opposite polarity in the next picture and will, therefore, as a first order effect tend to cancel as far as the human eye is concerned. The same results occur with respect to the monochrome-signal portion of a color-television receiver, which portion of the color receiver should ideally only reproduce the monochrome portion of the resulting color image.

In practice the desired operation just discussed is not wholly obtained. A major reason for departure from the ideal arises because the black-and-white receiver and the monochrome portion of the color receiver include one or more nonlinear signal-translating elements. Such nonlinear elements are effective to derive from the color signal some components which are even harmonics of one-half the line-scan frequency. Such even-harmonic color components produce stationary patterns in the monochrome portion of the reproduced image, which patterns are undesirably visible to the human eye. Such undesired effects in the monochrome portion of a reproduced image may, for convenience, be referred to as "color-to-monochrome cross talk."

One nonlinear element generally encountered in both color and black-and-white receivers is the image-reproducing device or picture tube. Another nonlinear element may be the second detector, the nonlinearity effects of which are basically affected by the vestigial-side-band transmission of the frequency interleaved color signal and the envelope detection process usually performed by such second detector.

It is an object of the invention, therefore, to provide new and improved color-television apparatus which minimizes image distortion caused by such imperfections in the frequency interleaved operation.

It is another object of the invention, therefore, to provide new and improved color-television apparatus which minimizes visible color-signal components appearing in the monochrome-signal portion of a television receiver due to nonlinear elements contained in such portion.

It is a further object of the invention to provide new and improved color-television transmitting apparatus which improves the quality of the black-and-white image reproduced by a black-and-white television receiver when receiving a color signal.

In accordance with one feature of the invention a communications system comprises a transmitter for transmitting a modulated carrier signal including a main signal component and a frequency-multiplexed second signal component. The system also includes a receiver including means exposed to both the main and second signal components and responsive to the main signal component for producing a desired stimulus in a utilizing means, the second signal having frequency characteristics different from the main signal such that the effects of the second signal component are largely ineffective in producing the aforesaid stimulus. Such receiver means also includes a nonlinear element which tends to cause spurious second signal components to have the frequency characteristics of the main signal and thereby be undesirably effective in producing the aforesaid stimulus. The system additionally includes apparatus included in the transmitter, the apparatus including means for generating a correction signal and means responsive to the correction signal, for modifying the portion of the main signal with which the second signal is to be frequency multiplexed to precorrect the main signal to compensate for the spurious second signal components having the main signal frequency characteristics in the receiver.

In accordance with another feature of the invention, apparatus for use in a transmitter which transmits a modulated carrier signal including a main signal component and a frequency-multiplexed subcarrier signal component comprises circuit means for supplying a main signal and circuit means for supplying a subcarrier signal. The apparatus also includes nonlinear circuit means having a nonlinearity corresponding to the nonlinearity of at least part of the main signal portion of a receiver and responsive to the subcarrier signal for developing a correction signal and circuit means responsive to the correction signal for modifying the portion of the main signal with which the subcarrier signal is to be frequency multiplexed to precorrect the main signal to compensate for spurious subcarrier signal components appearing in the main signal frequency range in the main signal portion of the receiver. The apparatus additionally includes circuit means for combining the modified main signal and the subcarrier signal in a frequency-multiplexed manner and supplying the combined signal to the carrier signal encoder of the transmitter.

For a better understanding of the present invention, together with other and further objects thereof, reference is had to the following description taken in connection with the accompanying drawings, and its scope will be pointed out in the appended claims.

Referring to the drawings.

Figure 1:
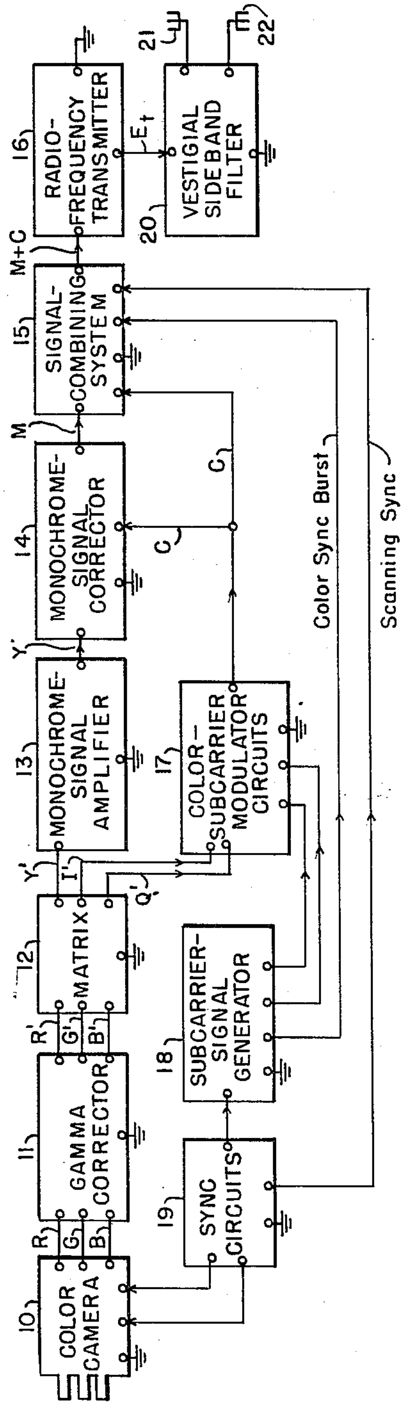
FIG. 1 is a circuit diagram of a representative embodiment of a color-television transmitter including signal precorrecting apparatus constructed in accordance with the present invention.

*FIG. 1 Transmitter*

Referring to FIG. 1 of the drawings, there is shown a representative embodiment of a color-television transmitter for transmitting an amplitude-modulated carrier signal including a monochrome-signal component and a frequency interleaved color-signal component. Such transmitter includes a color camera 10 for developing electrical signals representative of the red, green, and blue components of the scene being televised and a gamma corrector 11 for precorrecting the red, green, and blue signals in the usual manner to compensate for the nonlinear characteristics of the image-reproducing device or picture tube in a receiver. Such gamma-corrected color signals are then supplied to a matrix circuit 12 which combines these signals in a conventional manner to develop the usual monochrome video signal Y′ and, for example, the color video signals I′ and Q′, the primes denoting gamma correction.

The monochrome signal Y′ is then supplied by way of a monochrome-signal amplifier 13, a monochrome-signal corrector 14 which is constructed in accordance with the present invention, and a signal-combining system 15 to a radio-frequency transmitter 16. The operation of the monochrome-signal corrector 14 will be ignored for the present. The color video signals I′ and Q′ are supplied to color subcarrier modulator circuits 17 wherein they are individually modulated onto 3.6 megacycle subcarrier signals which are in phase quadrature with one another, the resulting subcarrier signals then being combined in the usual manner to form a composite color signal C which is then supplied to the signal-combining system 15. The individual subcarrier signals onto which the color video signals I′ and Q′ are encoded are developed by a subcarrier signal generator 18 which also serves to develop the usual color sync burst which is supplied to the signal-combining system 15.

The operation of the color camera 10 and the subcarrier signal generator 18 is controlled by means of vertical and horizontal deflection or scanning synchronizing pulses which are developed by sync circuits 19. Such sync pulses are also combined to produce a scanning synchronizing signal which is likewise supplied to the signal-combining system 15. The signal-combining system 15 is effective to combine all the signal components supplied thereto to form the usual composite video signal. Such signal is then encoded onto the radio-frequency carrier signal by the radio-frequency transmitter 16. The resulting amplitude-modulated carrier signal is then supplied to a vestigial-side-band filter 20 and then to an antenna system 21, 22 whereby it is radiated towards the neighboring receivers.

Figures 2, 4, 6, 7:
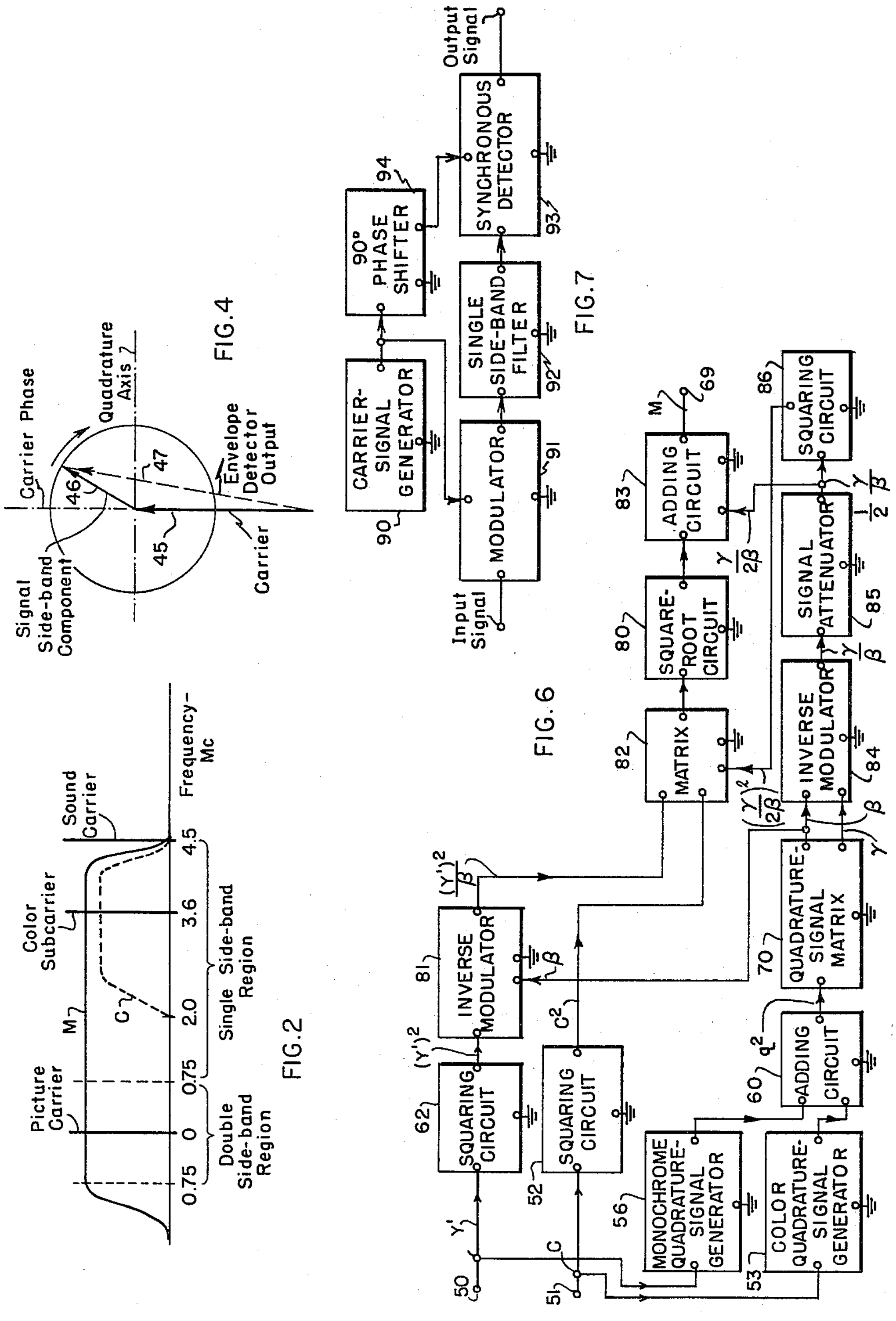
FIG. 2 is a graph representing the pass-band characteristic of the FIG. 1 transmitter.
FIG. 4 is a vector diagram used in explaining the operation of the receiver of FIG. 3.
FIG. 6 is a circuit diagram of another embodiment of signal precorrecting apparatus constructed in accordance with the present invention.
FIG. 7 is a circuit diagram of a wide-band phase shifter which may be used in the present invention.

The over-all frequency pass-band characteristic of the transmitter of FIG. 1 is represented by the graph of FIG. 2 and serves to indicate the frequency relationships between various ones of the signal components. For convenience, the picture carrier frequency is taken as the zero reference frequency to which the frequencies of the side-band components are referenced. As there indicated, the transmitted signal is of the vestigial-side-band type, the side-band components lying within approximately 0.75 megacycle of the picture carrier being transmitted in a double-side-band manner, while side-band components further removed from the picture carrier are transmitted in a single-side-band manner. As indicated, the color-signal components C are frequency interleaved with the monochrome-signal components M over the upper portion of the single-side-band region of the monochrome signal. The fact that these color-signal components are thus transmitted in a single-side-band manner gives rise to part of the distortion which it is the purpose of this invention to minimize.

Figure 3:
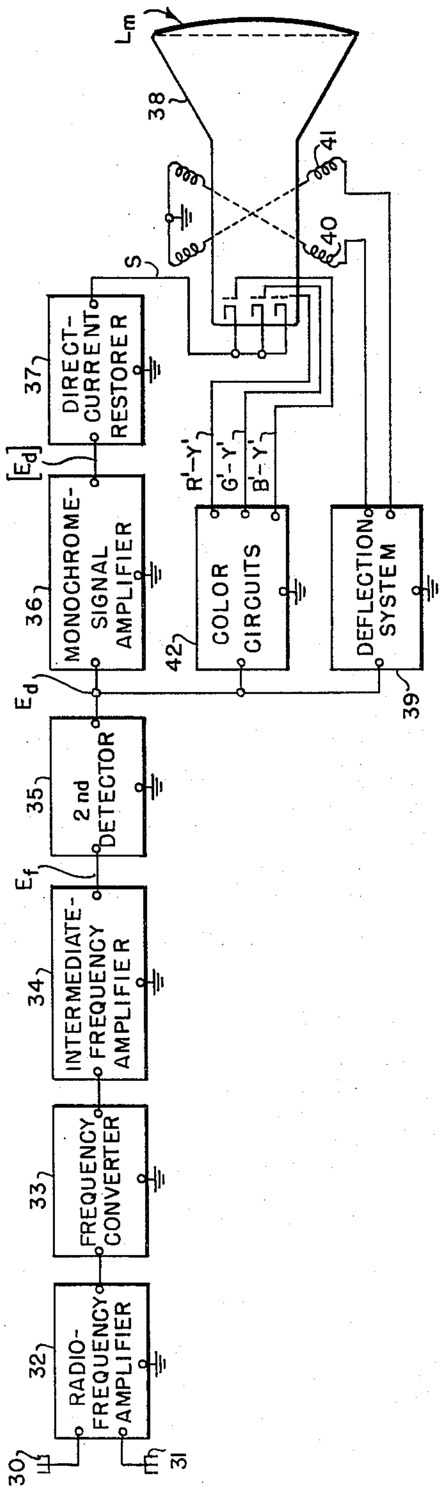
FIG. 3 is a block diagram of a representative embodiment of a color-television receiver.

*FIG. 3 Receiver*

Referring now to FIG. 3 of the drawings, there is shown a representative embodiment of a typical present-day color-television receiver. Such receiver includes an antenna system 30, 31 for intercepting the transmitted signal which, in turn, is supplied to a radio-frequency amplier 32 and a frequency converter 33. The frequency converter 33, which may include the usual modulator and local oscillator circuits, is effective to change the signal frequency down to an intermediate-frequency value and the resulting intermediate-frequency amplitude-modulated carrier signal is then amplified by an intermediate-frequency amplifier 34. The intermediate-frequency signal is then supplied to a second detector 35 which is usually a detector of the envelope type, such as a simple diode detector. The second detector 35 serves to separate the composite video-frequency modulation components from the intermediate-frequency carrier signal. The resulting composite video signal is then supplied by way of a monochrome-signal amplifier 36 and a direct-current restorer 37 to an image-reproducing device or picture tube 38. The deflection synchronizing components of the composite video signal are supplied to a deflection system 39, which in response thereto is effective to develop the usual scanning currents, which in turn are supplied to deflection windings 40 and 41 for causing the usual deflection of the electron beam of the picture tube 38 to form the desired raster pattern.

The color subcarrier components and the color synchronizing burst portion of the composite video signal are supplied to color circuits 42 of perhaps conventional construction. Such circuits 42 are effective to process the color subcarrier signal to develop the usual color-difference signals which are then supplied to the control electrodes of the picture tube 38. For the sake of illustration, a color receiver has been shown. As far as the present invention is concerned, however, it is immaterial whether it is a color receiver or a black-and-white receiver which is receiving the transmitted color signal. In this regard, the representative receiver of FIG. 3 differs from the conventional black-and-white receiver only in the inclusion of the color circuits 42 and the use of a three-color picture tube 38 as opposed to a single-color black-and-white picture tube.

As mentioned, the presence of nonlinear elements in the portion of the receiver which translates the monochrome-signal components causes color-signal components, which are also translated by such portion of the receiver, to be partially converted to even harmonics of one-half the line-scanning frequency thereby producing undesired visible effects in the black-and-white or monochrome portion of the reproduced image. The portion of the receiver which translates the monochrome-signal components includes the units 32–38, inclusive. One element of this portion of the receiver which is nonlinear in nature is the picture tube 38, which of necessity must handle the monochrome portion of the signal. Another element of this portion of the receiver which is nonlinear in nature is the second detector 35, since normally the second detector 35 is of the envelope detector type as illustrated by a simple diode detector. The nonlinearity arises partly from the single-side-band transmission of the color-signal components. The manner in which the nonlinearity arises may be seen by referring to the vector diagram of FIG. 4.

The vectors of FIG. 4 denote intermediate-frequency components appearing at the input of the second detector 35. The carrier is represented by vector 45 while one of the single-side-band color components is represented by the vector 46. Such single-side-band component represented by the vector 46 is continually varying in phase relative to the carrier phase. The envelope detector 35 which responds to the resultant or peak value of the intermediate-frequency component produces an output signal which varies in both amplitude and phase, as indicated by vector 47. A graph representing the amplitude variation with respect to time of the resultant vector 47 would show that the resulting output signal is somewhat distorted in wave form, such distortion containing nonlinear components indicative of the nonlinear processing of the signal. For convenience, such resultant signal is sometimes resolved into a pair of components along the carrier-phase and quadrature-phase axes, respectively, in which case the component along the quadrature-phase axis is referred to as an undesired quadrature component as opposed to the desired in-phase component along the carrier-phase axis. It is a purpose of the present invention to minimize or reduce the visible effects of the even-harmonic color-signal components which undesirably appear in the monochrome-signal portion of the receiver due to nonlinear signal-translating elements therein, such as the picture tube and second detector which have just been discussed.

*Mathematical Derivation of Required Signal Precorrection*

In accordance with the present invention, the visible color components appearing in the monochrome portion of the reproduced image as a result of the nonlinear processing of the frequency interleaved signals translated by the monochrome portion of the receiver will be precorrected for at the transmitter by precorrecting the monochrome signal to compensate for such undesired color components. Such precorrection will be performed by the monochrome-signal corrector 14 of the FIG. 1 transmitter. To this end, the monochrome-signal corrector 14 contains the requisite circuits for performing the desired modification of the conventional monochrome signal Y′ supplied thereto. Before the precorrection can be performed, however, it is necessary to know the nature of the modification which is required. Accordingly, there shall now be given a mathematical derivation which derives an equation which describes the modification required of the conventional monochrome signal Y′ to produce the properly precorrected signal.

In accordance with the presently-adopted color-television signal standard the present-practice monochrome signal Y′ may be described as follows:

$$Y'=0.30R'+0.59G'+0.11B' \qquad (1)$$

where R, G, and B denote the color signals red, green, and blue developed by the color camera 10. The primes associated with the R, G, and B signals indicate that these signals have been gamma corrected by being raised to the $$\frac{1}{\gamma}$$

power where $\gamma$ represents the exponent of the nonlinearity of the voltage-brightness characteristic of the picture tube 38 in the receiver. For most present-day picture tubes $\gamma$ is approximately equal to a factor of 2 and such approximation shall be assumed throughout the following derivation. The prime symbol associated with the symbol Y′ for the monochrome signal denotes that this signal is composed of gamma-corrected red, green, and blue components, the proportioning indicated by Equation 1 being performed by the matrix 12.

In view of the fact that the frequency interleaved monochrome and color signals are both translated by the monochrome portion of the receiver and in view of the fact that the picture tube 38 of the receiver is approximately a square-law device, that is, that the output light is proportional to the square of the input signal, then the monochrome or black-and-white portion of the reproduced image may be denoted by the following expression:

$$L_m=(M+C)^2=M^2+2MC+C^2 \qquad (2)$$

where $L_m$=monochrome channel luminance
$M$=transmitted monochrome signal (even harmonics, 0–4.5 mc.)
$C$=color subcarrier signal (odd harmonics, 2–4.5 mc.) in monochrome channel The $C^2$ term represents the undesired color-to-monochrome cross talk. This arises because of the fact that when a signal of a particular frequency is squared, such squaring in effect doubles the frequency of the signal. Doubling the frequency of an odd harmonic produces an even harmonic and, hence, this term represents an even harmonic of one-half the line-scanning frequency and, hence, is of the same polarity in successive pictures and, therefore, is undesirably visible to the human eye. The 2MC term on the other hand represents components which are odd harmonics of one-half the line-scanning frequency. Accordingly, as far as the human eye is concerned the relationship of Equation 2 may be simplified to the following form:

$$L_m=M^2+C^2 \qquad (3)$$

The undesired color-to-monochrome cross talk appearing in the reproduced image may, in accordance with the present invention, be precorrected for by transmitting a monochrome signal M which is described by the following expression:

$$M=\sqrt{(Y')^2-C^2} \qquad (4)$$

That the transmission of such a monochrome signal M would precorrect for the visible portions of the cross talk may be seen by substituting Equation 4 into Equation 3 in which case the result is denoted by the following expression:

$$L_m=(Y')^2 \qquad (5)$$

Equation 5 denotes the desired relationship between the present-practice monochrome signal Y′ and the monochrome portion of the reproduced image. An advantage of the form of precorrection indicated by Equation 4 is that the transmitted monochrome signal is precorrected only for undesired signal components which will be visible to the human eye.

The foregoing form of signal precorrection was obtained by assuming that the picture tube 38 was the only nonlinear element in the receiver and the remainder of the receiver had linear signal-translating characteristics. In practice, however, such is generally not the case as the second detector 35 is also nonlinear in nature. In order, therefore, to derive the expression for the form of precorrected monochrome signal which also takes into account the nonlinearity of the second detector 35 of the receiver, it is useful to derive an expression which takes into account the translation of the frequency interleaved signals through the various circuits between the transmitter and the receiver picture tube 38. To this end, it is convenient to start with the signal $E_t$ appearing at the output of the radio-frequency transmitter 16, and which may be defined by the following experssion:

$$E_t=(1-E)\cos\omega_c t \qquad (6)$$

where $E$=video modulation
$\omega_c$=angular frequency of carrier
$t$=time

Equation 6 is a conventional way of expressing a modulated carrier signal with the exception that the minus sign denotes the negative modulation technique used in color-television transmission.

The video modulation E may be represented by the following expression:

$$E=u_0+\sum_k u_k\cos\omega_k t \qquad (7)$$

where $u_0$=portion of composite video signal modulation transmitted in double-side-band manner.
$u_k \cos \omega_k t$=a component of the video signal modulation which is transmitted in a single-side-band manner.

The summation sign denotes that this term represents the sum of all the components which are to be transmitted in a single-side-band manner. This relationship of Equation 7 may then be substituted into Equation 6 and the Σ term expanded to contain terms representative of both lower and upper side bands. The lower-side-band terms corresponding to high modulation frequencies are then omitted because such side bands are suppressed by the vestigial-side-band filter 20. The resultant signal is then transmitted to the receiver wherein it is amplified by the radio-frequency amplifier 32 and then supplied to the frequency converter 33 which is effective to shift the frequency scale down to an intermediate-frequency range. This signal is then amplified by the intermediate-frequency amplifier 34 to produce an output signal $E_f$ which may be represented by the following expression:

$$E_f=(1-u_0)\cos\omega_f t-\sum_k Z_k u_k\cos(\omega_f t-\omega_k t) \qquad (8)$$

where $\omega_f$=intermediate-frequency value of carrier angular frequency.
$Z_k$=receiver frequency response or selectivity factor.

Equation 8 corresponds to the equation for the signal which is transmitted by the transmitter except that the carrier-frequency terms $\omega_f$ are in terms of the intermediate-frequency carrier value and the factor $Z_k$ representing the frequency response factor of the receiver, particularly the intermediate-frequency amplifier 34, has been introduced. This factor $Z_k$ represents the gain factor of, for example, the intermediate-frequency amplifier 34 as a function of the individual frequency components making up the single-side-band portion of the signal. In most present-day receivers, the pass band of the intermediate-frequency amplifier 34 is relatively flat over the major part of the single-side-band region, in which case the frequency response factor $Z_k$ is a constant. Such factor is included in the derivation to preserve the generality thereof.

By trigonometric identity, Equation 8 may be expanded to the following form:

$$E_f=(1-u_0)\cos\omega_f t\left\{-\sum_k Z_k u_k\cos\omega_k t.\cos\omega_f t+\sum_k Z_k u_k\cos(\omega_k t-90°).\sin\omega_f t\right\} \qquad (9)$$

wherein the single-side-band term is separated into an in-phase cosine term and a quadrature-phase sine term. To simplify the derivation the following definitions will now be made:

$$u\equiv\sum_k Z_k u_k\cos\omega_k t \qquad (10)$$

$$u^x\equiv\sum_k Z_k u_k\cos(\omega_k t-90°) \qquad (11)$$

The superscript symbol "x" of Equation 11 does not represent a factor raised to the "x" power but rather is an arbitrary symbol which is utilized to denote the fact that this is a quadrature-phase term that differs in phase by −90° from the signal components represented by the term "u." In this manner "u" represents in-phase modulation components over the single-side-band region while "$u^x$" denotes quadrature-phase modulation components over the same single-side-band region. Using these definitions to simplify Equation 9, such equation may then be represented by the following expression:

$$E_f=(1-u_0)\cos\omega_f t-u\cos\omega_f t-u^x\sin\omega_f t \qquad (12)$$

Equation 12 represents the signal supplied to the second detector 35 which is assumed to be an envelope detector having the form of, for example, a simple diode detector circuit. In other words, the detector 35 responds only to the resultant modulation fluctuations of the signal supplied thereto. As represented by Equation 12, such input signal contains in-phase and quadrature-phase signal components and, hence, the output of detector 35, denoted by the symbol $E_d$, may be represented by the following expression which represents the magnitude of the vector sum of the input signal components:

$$E_d=\sqrt{(1-u_0-u)^2+(u^x)^2} \qquad (13)$$

Equation 13 may be expressed as follows:

$$E_d=\sqrt{1+y} \qquad (14)$$

where "y" is used to denote all the "u" terms as follows:

$$y=-2(u_0+u)+(u_0+u)^2+(u^x)^2 \qquad (15)$$

Equation 14 may now be expanded in terms of a power series as follows:

$$E_d=1+\tfrac{1}{2}y-\tfrac{1}{8}y^2+\tfrac{1}{16}y^3-\tfrac{5}{128}y^4+\tfrac{35}{1280}y^5-\ \ldots \qquad (16)$$

This power series may be evaluated by determining the squares, cubes, etc. of the "y" term represented by Equation 15. Such higher power "y" terms are as follows:

$$y^2=4(u_0+u)^2+2(u_0+u)^2(u^x)^2-4(u_0+u)(u^x)^2+\text{higher power terms} \qquad (17)$$

$$y^3=12(u_0+u)^2(u^x)^2+\text{higher power terms} \qquad (18)$$

$$y^4=\text{higher power terms} \qquad (19)$$

Now substituting the relations of Equations 15, 17, 18, and 19 into Equation 16, Equation 16 may then be expressed as follows:

$$E_d=1-(u_0+u)+\tfrac{1}{2}(u_0+u)^2(u^x)^2+\tfrac{1}{2}(u_0+u)(u^x)^2+\tfrac{1}{2}(u^x)^2+\text{higher power terms} \qquad (20)$$

Equation 20 represents the detected signal $E_d$ in terms of a power series. Such signal is then translated by a video amplifier represented by the monochrome-signal amplifier 36. Accordingly, to obtain a first order solution, the signal appearing at the output of the monochrome-signal amplifier 36 may be represented by the following expression:

$$[E_d]\approx 1-[u_0+u]+\tfrac{1}{2}[(u_0+u)^2(u^x)^2]+\tfrac{1}{2}[(u_0+u)(u^x)^2]+\tfrac{1}{2}[(u^x)^2] \qquad (21)$$

where the terms higher than the second power have been ignored and the square brackets have been included to denote the band width limiting occurring in the monochrome-signal amplifier 36.

The derivation up to this point has been taken with the zero carrier level as the reference level from which signal amplitude variations are measured. This reference level is now changed by the action of the direct current restorer 37 which serves to establish the black level (blanking level) as the reference level from which amplitude variations are measured. This change in reference level may be mathematically expressed by the following form:

$$S=1-[E_d] \qquad (22)$$

wherein S denotes the signal appearing at the output of the direct-current restorer 37. Because of the square-law nature of the picture tube 38, this expression is more useful in its square form which is as follows:

$$S^2=(1-[E_d])^2 \qquad (23)$$

Equation 23 may now be expressed in terms of the modulation components $u$, $u_0$, and $u^x$, by substituting Equation 21 into Equation 23, the result of which is represented by the following expression:

$$S^2\approx[u_0+u]^2-[u_0+u][(u_0+u)(u^x)^2]-[u_0+u][(u^x)^2] \qquad (24)$$

Up to this point it has been effectively possible that the video modulation represented by the "$u$" terms could vary over the entire carrier level range from the zero carrier level up to the blanking level (0.75 peak carrier level). This, however, is not actually the case because the current television signal standards restrict the video-amplitude variations to the range from reference white (0.125 peak carrier level) to the blanking level. Accordingly, in order to preserve the normalized form of the equations such that one-hundred percent amplitude is equal to unity, it is necessary to change the scale factors if we wish to speak correctly in terms of video signal amplitudes as opposed to carrier modulation amplitudes. The necessary conversion factor is denoted by the following expression:

$$\frac{\text{Video range}}{\text{Modulation range}}=\frac{\text{Blanking-to-white}}{\text{Blanking-to-zero}}=\frac{62.5}{75}=\frac{5}{6} \qquad (25)$$

In other words, assuming a 100% video-amplitude variation, then in terms of the carrier modulation range this corresponds to a variation of $\frac{5}{6}$ times 100% or 83% of the carrier range from the blanking level to zero carrier level. Accordingly, the signal S in terms of carrier modulation amplitude at the input of the picture tube 38 may instead be expressed in terms of video amplitude as follows:

$$S=\tfrac{5}{6}V \qquad (26)$$

where $V$=video signal at picture tube (0–4.5 mc.)

Similarly, the following relation also holds:

$$S^2=(\tfrac{5}{6})^2V^2=(\tfrac{5}{6})^2L_m \qquad (27)$$

where the square-law relationship between the video signal V and the reproduced monochrome luminance $L_m$ corresponds to the square-law nature of the picture tube 38.

Converting the other modulation factors to video facts, $$u_0=\tfrac{5}{6}M_0 \qquad (28)$$

where $M_0$=double-side-band portion of monochrome signal (even harmonics, 0–0.75 mc.), and $$u=\tfrac{5}{6}(\underline{M}+C) \qquad (29)$$

where $\underline{M}$=single-side-band portion of monochrome signal (even harmonics, 0.75–4.5 mc.)

$C$=color subcarrier signal (odd harmonics, 2–4.5 mc.), and $$u^x=\tfrac{5}{6}(\underline{M}^x+C^x) \qquad (30)$$

where $\underline{M}^x$=phase-shifted (−90°) single-side-band portion (0.75–4.5 mc.) of monochrome signal $C^x$=phase-shifted (−90°) color subcarrier signal Also, the total monochrome signal M may be expressed as the sum of the double-side-band and single-side-band monochrome video components as follows:

$$M=M_0+\underline{M} \qquad (31)$$

Substituting the relationships of Equations 27–30, inclusive, into Equation 24 and simplifying by the relationship of Equation 31, Equation 24 becomes:

$$L_m\approx[M+C]^2-\tfrac{25}{36}[M+C][(M+C)(\underline{M}^x+C^x)^2]-\tfrac{5}{6}[M+C][(\underline{M}^x+C^x)^2] \qquad (32)$$

The expression of Equation 32 may be simplified in at least two ways. First, Equation 32 may be expanded and only the stationary terms corresponding to even harmonics of one-half the line-scanning frequency retained. In this manner the odd-harmonic terms which are invisible to the human eye anyway may be dropped and the characteristics of the human eye thereby used to the best advantage. In so doing, it should be remembered that the color-signal term C denotes odd harmonics while the square of such term denotes even harmonics. Also the product of two odd-harmonic terms produces even-harmonic terms, the product of an odd-harmonic term with an even-harmonic term produces odd harmonics, and the product of a function with its quadrature function produces no direct-current term. Secondly, Equation 32 may be simplified by making the following definition:

$$(\underline{M}^x)^2+(C^x)^2=q^2 \qquad (33)$$

where $q^2$ is an even-harmonic term denoting the sum of the squares of the various quadrature-phase terms. In this regard it should be carefully noted that the quadrature-phase term $\underline{M}^x$ which denotes the quadrature-phase component of only the monochrome-signal portion has been included in the derivation. Simplifying Equation 32 in the manner just mentioned results in the following expression:

$$L_m\approx[M^2+C^2]-\tfrac{25}{36}[M][Mq^2]-\tfrac{25}{36}[C]]Cq^2]-\tfrac{5}{6}[M][q^2] \qquad (34)$$

Equation 34 expresses the relationship between the transmitted video signals M and C and the corresponding visible luminance $L_m$ reproduced on the picture tube 38 of the receiver. As mentioned, it is desired that the relationship between the unmodified present-practice monochrome video signal Y′ and the reproduced picture luminance $L_m$ be as follows:

$$L_m=(Y')^2 \qquad (35)$$

Therefore, this desired result will be obtained if the luminance actually developed, as represented by Equation 34, is made the same as the desired luminance represented by Equation 35. Ignoring the square brackets denoting video band-width limiting, this desired equality may be represented by the following expression:

$$(Y')^2\approx(M^2+C^2)-\tfrac{25}{36}M^2q^2-\tfrac{25}{36}C^2q^2-\tfrac{5}{6}Mq^2 \qquad (36)$$

The expression of Equation 36 gives the final form of the derivation in the sense that it describes the relationship between the present-practice uncorrected monochrome signal Y' and the monochrome signal M and color signal C which are actually transmitted. In order to know how to modify the uncorrected monochrome signal Y' it is only necessary to solve Equation 36 for M. There are a variety of first-order or other solutions which may be adequate.

At this point it should be mentioned that the relationship of Equation 36 contains more than the necessary correction factors to compensate for the undesired color-to-monochrome cross talk. It also contains the factors necessary to obtain precorrection for quadrature distortion of only the monochrome portion of the signal. In other words, envelope detection in the second detector 35 of the single-side-band portion of the monochrome signal gives rise to a further form of distortion commonly referred to as quadrature distortion of the monochrome signal. This form of distortion is separate and distinct from the color-to-monochrome cross talk and occurs whether or not a color signal is being transmitted along with the monochrome signal. Precorrection of the monochrome signal to compensate for such monochrome-signal quadrature distortion is more fully discussed in applicant's copending application, Serial No. 636,198, entitled "Signal Precorrecting Apparatus for Minimizing Quadrature Distortion," filed January 24, 1957. The factors corresponding to such monochrome-signal quadrature distortion are denoted by the $\underline{M}^x$ term included in the definition of $q^2$ of Equation 33 and shall be included in the present derivation for sake of completeness. In other words, it may very well be desired to perform both types of signal correction at the same time and, as will be seen, the two types of apparatus may be advantageously combined to obtain both corrections with a minimum of circuitry.

Considering now the solution of Equation 36, an approximate solution thereof may be obtained by defining M as follows:

$$M=(Y')+b \qquad (37)$$

where $b$=additional component necessary to precorrect present practice (Y') signal. This expression for M may then be substituted into the right hand terms of Equation 36 containing the quadrature terms $q^2$. These latter terms may then be expanded and the resulting terms containing the factor $b$ may be omitted because both the factor $b$ and the quadrature term $q^2$ are small so that their product is relatively insignificant compared to the M and Y' terms. When this is done the resulting equation may then be solved for M and one first-order solution is as follows:

$$M\approx\sqrt{(Y')^2(1+\tfrac{25}{36}q^2)-C^2(1-\tfrac{25}{36}q^2)+\tfrac{5}{6}(Y')q^2} \qquad (38)$$

Equation 38 denotes a form of the transmitted monochrome signal M which is adequate to precorrect for both color-to-monochrome cross talk and monochrome-signal quadrature distortion. This relationship is in terms of signals which are presently available in present-practice transmitters. As will be noted from the equation, the aprimary feature is that the present-practice monochrome signal Y' must be modified in a nonlinear manner in accordance with the color-signal component $C^2$. Further modification in accordance with the quadrature term $q^2$ is required if it is desired to also correct for the nonlinearity of the second detector. In other words, assuming that $q$ is zero, then Equation 38 reduces to the simple correction factor of Equation 4 which, as mentioned, gives the appropriate correction where the picture tube 38 is the only nonlinear element in the monochrome portion of the receiver. The $q^2$ factors may, where desired, represent the envelope detector quadrature distortion of both the color signal and the monochrome-signal components.

Equation 38 may be stated in a more simplified form by defining the different proportions of the quadrature terms as follows:

$$\alpha=\left(1+\frac{25}{36}q^2\right)$$
$$\beta=\left(1-\frac{25}{36}q^2\right) \qquad (39)$$
$$\gamma=\frac{5}{6}q^2$$

These definitions enable the expression of Equation 38 to be simplified to the following form:

$$M\approx\sqrt{\alpha(Y')^2-\beta C^2+\gamma Y'} \qquad (40)$$

As will be mentioned more in detail hereinafter, this form of correction as represented by Equation 40 may be obtained by utilizing the apparatus described in FIG. 5.

A more exact form of solution of Equation 36 may be obtained by utilizing the quadratic solution thereof. The quadratic solution of Equation 36, together with the simplifying definition of Equation 39, result in the following expression for the precorrected monochrome signal M:

$$M\approx\frac{\gamma}{2\beta}+\sqrt{\left(\frac{\gamma}{2\beta}\right)^2+\frac{(Y')^2}{\beta}-C^2} \qquad (41)$$

This form of signal correction as represented by Equation 41 may be obtained by use of the apparatus of FIG. 6 which will be described hereinafter.

Figure 5:
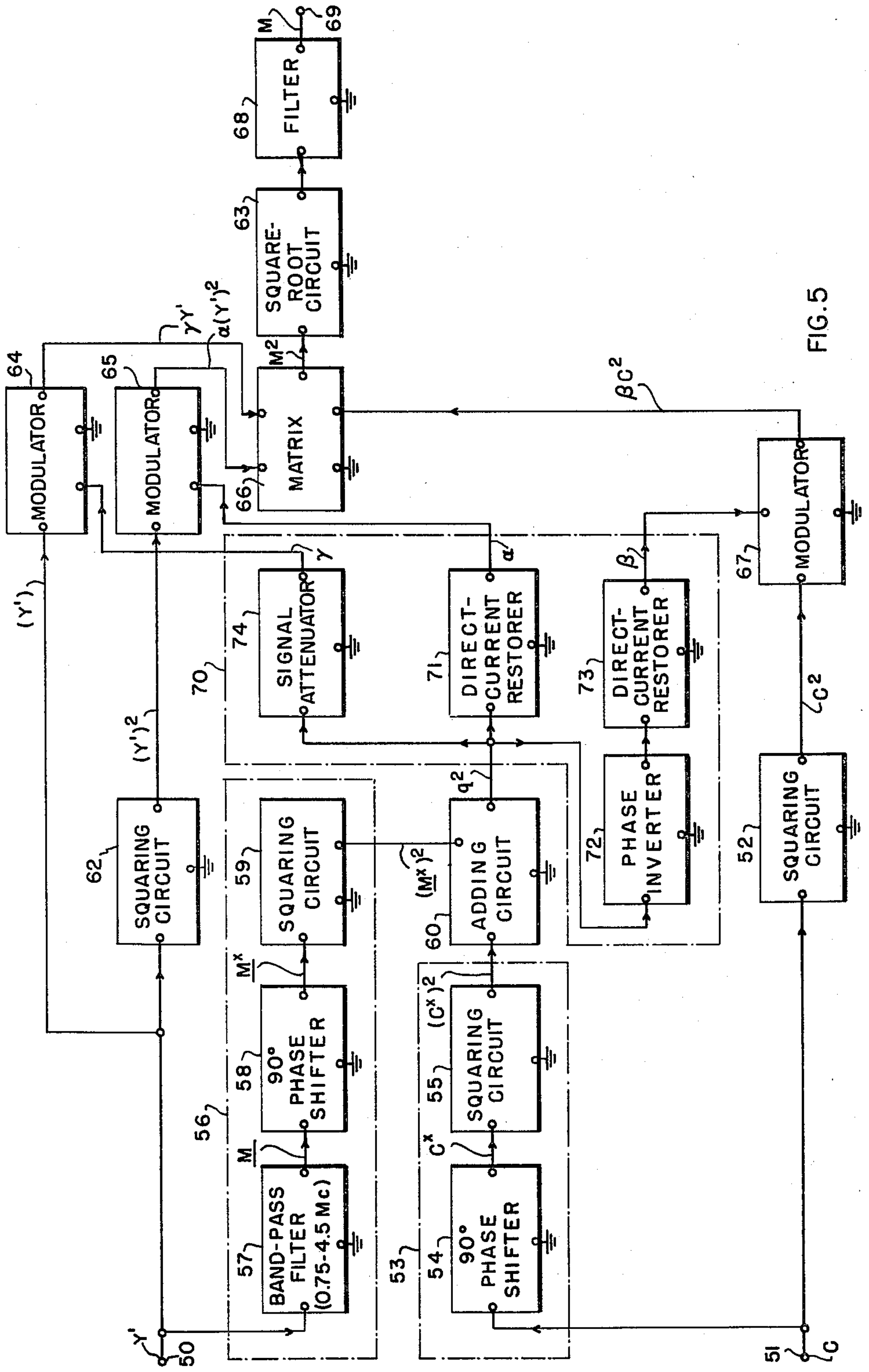
FIG. 5 is a more detailed circuit diagram of a representative embodiment of signal precorrecting apparatus constructed in accordance with the present invention.

*Description of FIG. 5 Signal-Correcting Apparatus*

Referring now to FIG. 5 of the drawings, there is shown signal-correcting apparatus for use in a color-television transmitter which transmits an amplitude-modulated carrier signal including a monochrome-signal component and a frequency interleaved color-signal component. More specifically, the apparatus of FIG. 5 represents in detail one form of apparatus that may be used as the monochrome-signal corrector 14 of the FIG. 1 transmitter. To this end, the apparatus of FIG. 5 includes circuit means for supplying a monochrome signal. This circuit means may include, for example, the input terminal 50 as well as the other portions of the transmitter which are coupled to this terminal 50 for supplying the present-practice monochrome signal Y' thereto. The apparatus of FIG. 5 also includes circuit means for supplying a color signal. This circuit means is represented, for example, by an input terminal 51 as well as the other portions of the transmitter which are coupled to this terminal 51 for supplying, for example, the present-practice color subcarrier signal C thereto.

The apparatus of FIG. 5 further includes circuit means having a nonlinearity corresponding to the nonlinearity of at least part of the monochrome-signal portion of a television receiver and responsive to the color signal C for developing a correction signal. The circuit means for developing this correction signal may take any one of several different forms depending on the nonlinear element of the receiver for which it is desired to correct. For example, to correct for the nonlinearity of the image-reproducing device or picture tube 38 in the receiver, the apparatus of FIG. 5 includes a squaring circuit 52 for developing a correction signal corresponding to the square of the color signal C. The possible circuit details of squaring circuits such as the squaring circuit 52 are relatively widely known in the art and may take any one of several forms. For example, such squaring circuit might include a modulator tube wherein the signal to be squared is supplied to two different electrodes thereof so that, in effect, such signal is multiplied by itself to produce the desired squaring action.

Where it is desired to correct for the non-linear effects of the second detector 35 of the receiver when detecting signal-side-band signal components, the circuit means for developing the correction signal takes the form of a color quadrature signal generator as indicated by the dash-line box 53 and serves to develop a quadrature-phased replica $C^x$ of the color signal C. To this end, the color quadrature signal generator 53 may include a 90° phase shifter 54 and a squaring circuit 55, the 90° phase shift producing the desired quadrature replica $C^x$ and the squaring circuit 55 serving to square this quadrature signal to impart to such signal the desired nonlinearity. Because the color signal to be phase shifted is relatively wide band in nature, a novel type of phase shifter, as will be described more particularly in connection with FIG. 7, may be used as the phase shifter 54.

Depending on the amount and nature of correction desired, only the picture tube correction signal from the squaring circuit 52 or only the color quadrature correction signal from the unit 53 may be utilized or, as indicated in FIG. 5, both may be used simultaneously. Also, should the receiver include nonlinear elements other than those discussed, then the apparatus of FIG. 5 may contain further circuits for generating appropriate additional correction signals.

Where desired, the apparatus of FIG. 5 may also include a monochrome quadrature signal generator, represented by the units within the dash-line box 56, for developing a monochrome quadrature signal for correcting for quadrature distortion of the single-side-band portion of the monochrome signal. As mentioned, this form of signal correction is the subject matter of the above-mentioned copending application of the present applicant. It is, however, included in the present description in order to illustrate how readily the two types of signal correction may be utilized together with only a minimum of additional circuitry being required. The monochrome quadrature signal generator 56 may include a band-width limiting filter 57, a phase shifter 58, and a squaring circuit 59. The phase shifter 58 is preferably a 90° phase shifter for generating a quadrature-phased replica $\underline{M}^x$ of the single-side-band portion of the input signal and, likewise, may take the form of the novel phase shifter to be discussed in connection with FIG. 7. The band-width limiting filter 57 may be of the band-pass type as indicated or instead may be of the high-pass type. The squaring circuit 59 serves to modify the monochrome quadrature signal in accordance with the appropriate nonlinearity factor.

Where it is desired to correct for both the monochrome and the color quadrature distortion, then the apparatus of FIG. 5 may include circuit means represented by an adding circuit 60 for combining the monochrome and color quadrature correction signals to form a composite quadrature correction signal $q^2$.

The signal-correcting apparatus of FIG. 5 also includes circuit means responsive to the correction signal for modifying the portion of the monochrome signal with which the color signal is to be frequency interleaved to precorrect the monochrome signal to compensate for any color-signal components appearing in the monochrome-signal frequency intervals in the monochrome-signal portion of the television receiver. Such circuit means is represented generally by the remainder of the units of the FIG. 5 apparatus, the specific units being required depending on which and how many of the correction signals previously mentioned are to be utilized. More particularly, as illustrated by FIG. 5, such circuit means which are responsive to the correction signals for modifying the monochrome signal may include a squaring circuit 62, modulator circuit means, and a square root circuit 63, all for the purpose of translating the monochrome video signal. The modulator circuit means may include a pair of modulators 64 and 65 for translating the monochrome signal proper, a matrix 66, and another modulator 67 for supplying the picture tube correction signal to the matrix 66 for further modifying the monochrome video signal in accordance therewith. The matrix 66 may take the form of a conventional signal matrix for appropriately adding and subtracting the individual signals supplied thereto. The square root circuit 63 may, for example, take the form of any of the well known types of gamma-corrector circuits which are well known in the art. In addition, the circuit means responsive to the correction signal may further include a filter 68 for supplying the resultant precorrected monochrome signal to the output terminal 69 of the FIG. 5 apparatus.

The circuit means responsive to the correction signals may also include matrixing circuit means for proportioning the quadrature correction signal and for supplying proportioned quadrature signal components to the modulator circuit means 64, 65, and 67 for modifying the monochrome signal and the color-correction signal for obtaining the desired precorrection for quadrature distortion. Such matrixing circuit means may take the form of a quadrature signal matrix as represented by the units within the dash-line box 70. More specifically, such matrixing circuit means 70 contains appropriate circuits for performing the proportioning of the composite quadrature signal $q^2$ as indicated by the mathematical relationships of Equation 39. To this end, the matrixing circuit means 70 may include a direct-current restorer 71 for obtaining the proportioning indicated by the $\alpha$ term, a phase inverter 72 and a direct-current restorer 73 for obtaining the proportioning indicated by the $\beta$ term, and a signal attenuator 74 for obtaining the proportioning indicated by the $\gamma$ term.

Where the signal precorrection is to be applied at video frequencies, as indicated by the representative location of the monochrome-signal corrector 14 of FIG. 1, then the signal-correcting apparatus may also include circuit means for combining the modified monochrome signal and the color signal in a frequency-interleaved manner and supplying the combined signal to the carrier signal encoder of the transmitter as represented by the radio-frequency transmitter 16 of FIG. 1. Such circuit means is represented, for example, by the signal-combining system 15 of FIG. 1 which combines the corrected monochrome signal M from the signal corrector 14 with the conventional color subcarrier signal C from the modulator circuits 17. Frequency interleaving is automatically obtained due to the choice of the frequency used as the subcarrier frequency.

*Operation of FIG. 5 Signal-Correcting Apparatus*

Considering now the operation of the apparatus of FIG. 5 just described, such apparatus serves to modify the present-practice monochrome signal Y′ supplied thereto in accordance with the relationship expressed by Equation 40 to produce the desired signal precorrection which compensates for the breakdown of frequency interleaving in the monochrome channel of the receiver. Considering in detail the operation of the FIG. 5 apparatus, the input signal Y′ is squared by the squaring circuit 62, translated by the modulator 65 and matrix 66, and then square rooted by the square root circuit 63. Assuming that no other signals are supplied to the modulator 65 and matrix 66, then the successive square and square root operations would result in the original Y′ signal appearing at the output terminal 69 of the apparatus. Modification of the conventional Y′ signal by the picture tube correction signal $C^2$, which is supplied to the matrix 66 by way of the modulator 67, causes such correction signal $C^2$ to be subtracted from the squared monochrome signal Y′ in the matrix 66. Assuming that this is the only correction signal being used, then the basic signal correction represented mathematically by the expression of Equation 4 is obtained. As mentioned, however, this only corrects for the nonlinearity of the receiver picture tube. To further correct the monochrome signal for the quadrature distortion arising in the second detector of the receiver, such monochrome signal is further modified in accordance with the quadrature correction factors $\alpha$, $\beta$, and $\gamma$ which are supplied to the modulators 64, 65, and 67.

The composite quadrature correction signal $q^2$ is represented mathematically by the expression of Equation 33 which for convenience is repeated here as follows:

$$q^2=(\underline{M}^x)^2+(C^x)^2 \quad (42)$$

where $\underline{M}^x$=phase-shifted (−90°) single-side-band portion (0.75–4.5 mc.) of monochrome signal
$C^x$=phase-shifted (−90°) color subcarrier signal As indicated, such composite quadrature signal $q^2$ is obtained by adding the squared monochrome and color quadrature signals in the adding circuit 60. The monochrome quadrature signal $\underline{M}^x$ is developed by the monochrome quadrature signal generator 56 which is effective to pass the single-side-band portion $\underline{M}$ of the Y′ video signal and then to phase shift these single-side-band components by the quadrature factor of 90° to develop the desired quadrature signal $\underline{M}^x$. This signal is then squared by the squaring circuit 59 to take into account the receiver nonlinearity. In a somewhat similar manner, the color quadrature correction signal is developed by the color quadrature signal generator 53 which is responsive to the color subcarrier signal C to shift the phase of such signal by the quadrature factor of 90° to obtain the color quadrature signal $C^x$. This signal is squared by the squaring circuit 55 to take into account the nonlinearity of the receiver. The resulting signals from the generators 53 and 56 are then added together by the adding circuit 60 to obtain the composite quadrature signal $q^2$ of Equation 42.

The composite quadrature signal $q^2$ is then proportioned by the matrixing circuit means or quadrature signal matrix 70 to develop the desired $\alpha$, $\beta$, and $\gamma$ proportions as defined by Equation 39. With regard to the $\alpha$ proportion, the direct-current restorer 71 is effective to establish the unit reference level to which the desired proportion of the squared quadrature signal is added as indicated by Equation 39. The proper fraction of this signal may be obtained by properly proportioning the attenuation in the input circuit of the direct-current restorer 71. With regard to the $\beta$ term, the desired proportioning is obtained by the phase inverter 72 which serves to supply the minus sign and the direct-current restorer 73 which serves to supply the unit reference level from which the negative signal is subtracted in accordance with the $\beta$ relationship of Equation 39. With regard to the $\gamma$ term, such proportioning is obtained by the signal attenuator 74 which develops an output signal which is the appropriate fraction of the input signal as indicated by the $\gamma$ relationship of Equation 39.

The $\alpha$, $\beta$, and $\gamma$ proportions of the composite quadrature correction signal are supplied respectively to the modulator 65, the modulator 67, and the modulator 64 to modulate or multiply the signals being translated by such modulators by these respective proportions. As a result, signals corresponding to the individual terms of Equation 40 are obtained. The unsquared or linear Y′ term developed by the modulator 64 is necessary in order to compensate for linear distortion components which are effectively coupled in by the envelope detector quadrature distortion in the receiver. The individual terms are then combined by the matrix 66 and the resultant signal square rooted by the square root circuit 63 to obtain the desired precorrected monochrome signal M as defined by Equation 40.

*Description of FIG. 6 Signal-Correcting Apparatus*

Referring now to FIG. 6 of the drawings, there is shown an alternative embodiment of signal-correcting apparatus that may be used as the monochrome-signal corrector 14 of the FIG. 1 transmitter. The parts of the FIG. 6 apparatus which correspond to parts of the FIG. 5 apparatus have been indicated by the same reference numerals. In particular the color quadrature signal generator 53, the monochrome quadrature signal generator 56, and the quadrature signal matrix 70 have been shown as single boxes instead of showing the details thereof as was done in FIG. 5. The details, of course, may be the same as in FIG. 5 except that the quadrature signal matrix 70 need not include any provision for developing the $\alpha$ factor because such factor is not required in the FIG. 6 apparatus.

Like the apparatus of FIG. 5, the apparatus of FIG. 6 includes circuit means having a nonlinearity corresponding to the nonlinearity of at least part of the monochrome-signal portion of a television receiver and responsive to the color signal for generating a correction signal. To correct for the picture tube nonlinearity, the apparatus of FIG. 6 includes the squaring circuit 52 for developing the correction signal $C^2$. To correct for the second detector quadrature distortion, the apparatus of FIG. 6 includes the monochrome quadrature signal generator 56, the color quadrature signal generator 53, and the adding circuit 60 which serve to develop the composite quadrature signal $q^2$, which signal is then properly proportioned by the quadrature signal matrix 70 to develop the desired $\beta$ and $\gamma$ factors.

Similarly, the apparatus of FIG. 6 includes circuit means responsive to the correction signals for modifying the portion of the monochrome signal with which the color signal is to be frequency interleaved to precorrect the monochrome signal to compensate for any color-signal components appearing in the monochrome signal frequency intervals in the monochrome-signal portion of the television receiver. Such means includes the squaring circuit 62, modulator circuit means, and a square root circuit 80. In this case, the modulator circuit means includes an inverse modulator 81, a matrix 82, and an adding circuit 83. Such circuit means which is responsive to the correction signal also includes matrixing circuit means represented, for example, by the quadrature signal matrix 70, inverse modulator 84, a signal attenuator 85, and a squaring circuit 86.

The inverse modulators 81 and 84 may, for example, take the form of a pentode modulator tube having a pair of input control electrodes where the tube is operated so that the characteristic for one of the input electrodes is such that it is square law in nature. This utilizes the fact that a square law input-output characteristic gives an output that is approximately the reciprocal of the input. Such reciprocal is then multiplied with the signal supplied to the other input control electrode in accordance with conventional modulator theory to produce the desired inversely modulated signal at the output.

*Operation of FIG. 6 Signal-Correcting Apparatus*

Considering now the operation of the FIG. 6 signal-correcting apparatus just described, such apparatus modifies the conventional monochrome signal Y′ in accordance with the relation described by Equation 41 to produce the desired precorrected signal M which is subsequently supplied to the radio-frequency transmitter. As before, the successive squaring and square root operations performed by the squaring circuit 62 and square root circuit 80 would, in the absence of other signals, result in an output signal corresponding to the original input signal Y′. Such signal is, however, modified while in a squared condition by the matrix 82 which serves to subtract the picture tube correction signal $C^2$ from the squared monochrome signal. Previous to this, however, the squared monochrome signal is modified in the inverse modulator 81 by a factor corresponding to the reciprocal of the $\beta$ term as defined by Equation 39, which factor is developed by the quadrature signal matrix 70. This affords part of the modification required to correct for quadrature distortion.

Additional quadrature factors are added in by the matrix 82 and the adding circuit 83 in accordance with the corresponding terms of Equation 41. Thus, one term is added by the matrix 82 before the square root operation occurs while the other term is added by the adding circuit 83 after the square root operation has occurred. As indicated, these additional terms represent further proportions of the squared quadrature signal $q^2$ and are obtained by multiplying the $\gamma$ term by the reciprocal of the $\beta$ term in the inverse modulator 84, reducing the resultant ratio by a factor of one-half in the signal attenuator 85, and then supplying the resultant to both the adding circuit 83 and the squaring circuit 86. The squaring circuit 86 in turn squares the resultant signal before it is supplied to the matrix 82. In this manner the resulting precorrected monochrome signal M appearing at the output terminal 69 is properly modified in accordance with the relations described by Equation 41.

*FIG. 7 Wide-Band Phase Shifter*

Referring now to FIG. 7 of the drawings, there is shown an adjustable phase shifter circuit which is capable of handling rather wide-band video signals and, hence, is particularly suited for use as the phase shifter in the quadrature signal generators 53 and 56 of either the FIG. 5 or FIG. 6 apparatus. This wide-band phase shifter of FIG. 7 operates on the fact that single-side-band carrier modulation components are continually varying in phase and upon the further fact that synchronous detection of such signal components may be utilized to extract such components at any desired phase angle.

More particularly, as shown in the representative embodiment of FIG. 7, a carrier signal of suitable carrier frequency is generated by a carrier-signal generator 90 and then supplied to a modulator 91. Also supplied to the modulator 91 is an input signal which represents the video signal which is to be phase shifted. The modulator 91 is effective to encode the input signal as amplitude modulation of the carrier signal in a conventional manner. The resulting carrier signal, which is double side band in nature, is then supplied to a single-side-band filter 92 which suppresses one of the sets of side bands, thereby producing a single-side-band signal at the output thereof. In this manner, the input signal is converted to single-side-band modulation components which, because they are single side band in nature, are continually varying in phase relative to the carrier phase.

Such single-side-band components are then supplied to a synchronous detector 93. Also supplied to the synchronous detector 93 is the carrier signal developed by the carrier-signal generator 90 after being translated by a phase shifter 94. The carrier signal reaching the synchronous detector 93 by way of the phase shifter 94 is unmodulated in nature, that is, of constant amplitude but of the same frequency as the carrier signal upon which the input signal is encoded. In accordance with conventional synchronous detector theory, such unmodulated carrier signal heterodynes with the single-side-band components to reduce them directly to video frequency, that is, to detect them. In other words, the difference-frequency components arising from the heterodyning action are of video frequency the same as if the modulated carrier signal had been detected by an ideal linear detector.

It is an important characteristic of the synchronous detector 93, however, that the phase of the video output signal from the detector 93 corresponds to the phase of the unmodulated constant amplitude carrier signal supplied to the synchronous detector 93 by way of the phase shifter 94. In other words, synchronous detection of single-side-band components changes the phase but not the amplitude of such components. Thus, the desired phase shift that is produced is the phase shift which is given to the unmodulated carrier signal as it passes through the phase shifter 94. This phase shift may be selected to be any desired value.

The important point is that the phase shifter 94 need not be in any way wide band in nature and, in fact, the band width thereof might be very narrow. This is because the phase shifter 94 only has to translate a single frequency component, namely, the unmodulated carrier signal. The band width of the input video signal, on the other hand, is determined by the band widths of the modulator 91, the single-side-band filter 92, and the synchronous detector 93 and, hence, these units must have band widths corresponding to the band width of the input video signal. It is well known, however, how to build these units with relatively wide band widths. Accordingly, the phase-shifting apparatus of FIG. 7 represents a new and improved way of obtaining the desired phase shift of a relatively wide-band video signal.

*Conclusion*

From the foregoing descriptions of the various embodiments of the invention, it will be apparent that signal-correcting apparatus constructed in accordance with the present invention represents new and improved apparatus for use in a color-television transmitter. Such apparatus improves the quality of the images reproduced on both color and black-and-white receivers by minimizing visible color components which undesirably appear in the monochrome-signal portions of such receivers because of non-linear signal-translating elements in such portions of the receiver. Also the apparatus for correcting for this color-to-monochrome cross talk may readily be combined with apparatus for minimizing visible effects due to quadrature distortion of the single-side-band portion of the monochrome signal so that both types of correction may be obtained with a minimum amount of circuitry.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A communications system comprising: a transmitter for transmitting a modulated carrier signal including a main signal component and a frequency-multiplexed second signal component; a receiver including means exposed to both the main and second signal components and responsive to the main signal component for producing a desired stimulus in a utilizing means, the second signal having frequency characteristics different from the main signal such that the effects of the second signal component are largely ineffective in producing said stimulus, such receiver means also including a non-linear element which tends to cause spurious second signal components to have the frequency characteristics of the main signal and thereby be undesirably effective in producing said stimulus; and apparatus included in the transmitter, said apparatus including means for generating a correction signal and means responsive to said correction signal for modifying the portion of the main signal with which the second signal is to be frequency multiplexed to precorrect the main signal to compensate for the spurious second signal components having the main signal frequency characteristics in the receiver.

2. A communications system comprising: a transmitter for transmitting in a vestigial-side-band manner an amplitude-modulated carrier signal including a main signal component and a frequency-multiplexed subcarrier signal component; a receiver including an envelope detector for detecting the frequency-multiplexed modulation components and a main signal channel coupled thereto for supplying these signal components to a ultilizing means, such means being responsive to the main signal component for producing a desired stimulus, the subcarrier signal having frequency characteristics different from the main signal such that the effects of the subcarrier signal component translated by the main signal channel are largely ineffective in producing said stimulus, the quadrature distortion produced by the envelope detector tending, however, to cause subcarrier signal components translated by the main signal channel to have the frequency characteristics of the main signal and thereby be undesirably effective in producing said stimulus; and apparatus included in the transmitter and including nonlinear circuit means responsive to the subcarrier signal for generating a quadrature correction signal, and circuit means responsive to the correction signal for modifying the portion of the main signal with which the subcarrier signal is to be frequency multiplexed to precorrect the main signal to compensate for the spurious subcarrier signal components having the main signal frequency characteristics in the receiver.

3. A television system comprising: a color-television transmitter for transmitting an amplitude-modulated carrier signal including a monochrome-signal component and a frequency-interleaved color-signal component; a television receiver including means exposed to both the monochrome and color-signal components and responsive to the monochrome-signal component for producing a monochrome image, the color-signal frequency intervals being such that the effects of the color-signal components are largely invisible to the human eye, such receiver means also including a nonlinear element which tends to cause spurious color-signal components to appear within the monochrome-signal frequency intervals and thereby be undesirably visible; and apparatus included in the transmitter, said apparatus including means for generating a correction signal and means responsive to said correction signal for modifying the portion of the monochrome signal with which the color signal is to be frequency interleaved to precorrect the monochrome signal to compensate for the spurious color-signal components appearing in the monochrome-signal frequency intervals in the receiver.

4. A television system comprising: a color-television transmitter for transmitting an amplitude-modulated carrier signal including a monochrome-signal component and a frequency-interleaved color-signal component; a television receiver having a predetermined frequency response characteristic and including means exposed to both the monochrome and color-signal components and responsive to the monochrome-signal component for producing a monochrome image, the color-signal frequency intervals being such that the effects of the color-signal component are largely invisible to the human eye, such receiver means also including a nonlinear element which tends to cause spurious color-signal components to appear within the monochrome-signal frequency intervals and thereby be undesirably visible; and apparatus included in the transmitter, said apparatus including means responsive to the second signal component for generating a correction signal and means responsive to said correction signal for modifying in accordance with said frequency-response characteristic the portion of the monochrome signal with which the color signal is to be frequency interleaved to precorrect the monochrome signal to compensate for the spurious color-signal components appearing in the monochrome-signal frequency intervals in the receiver.

5. A television system comprising: a color-television transmitter for transmitting an amplitude-modulated carrier signal including a monochrome-signal component and a frequency-interleaved color-signal component; a television receiver including means exposed to both the monochrome and color-signal components and responsive to the monochrome-signal component for producing a monochrome image, the color-signal frequency intervals being such that the effects of the color-signal component are largely invisible to the human eye, such receiver means also including a nonlinear element which tends to cause spurious color-signal components to appear within the monochrome-signal frequency intervals and thereby be undesirably visible; and apparatus included in the transmitter, said apparatus including nonlinear circuit means for generating a correction signal and means responsive to said correction signal for modifying the portion of the monochrome signal with which the color signal is to be frequency interleaved to precorrect the monochrome signal to compensate for the spurious color-signal components appearing in the monochrome-signal frequency intervals in the receiver.

6. A television system comprising: a color television transmitter for transmitting an amplitude-modulated carrier signal including a monochrome-signal component and a frequency-interleaved color-signal component; a television receiver including means exposed to both the monochrome and color-signal components and responsive to the monochrome-signal component for producing a monochrome image, the color-signal frequency intervals being such that the effects of the color-signal component are largely invisible to the human eye, such receiver means also including a nonlinear element which tends to cause spurious color-signal components to appear within the monochrome-signal frequency intervals and thereby be undesirably visible; and apparatus included in the transmitter, said apparatus including nonlinear circuit means responsive to the second signal component for generating a correction signal and means responsive to said correction signal for modifying the amplitude of the portion of the monochrome signal with which the color signal is to be frequency interleaved to precorrect the monochrome signal to compensate for the spurious color-signal components appearing in the monochrome-signal frequency intervals in the receiver.

7. A television system comprising: a color-television transmitter for transmitting an amplitude-modulated carrier signal including a monochrome-signal component and a frequency-interleaved color-signal component; a television receiver including means exposed to both the monochrome and color-signal components and responsive to the monochrome-signal component for producing a monochrome image, the color-signal frequency intervals being such that the effects of the color-signal component are largely invisible to the human eye, such receiver means also including a nonlinear element which tends to cause spurious color-signal components to appear within the monochrome-signal frequency intervals and thereby be undesirably visible; and apparatus included in the transmitter, said apparatus including means for generating a correction signal and means responsive to said correction signal for modifying prior to encoding on the carrier signal the portion of the monochrome video signal with which the color signal is to be frequency interleaved to precorrect the monochrome signal to compensate for the spurious color-signal components appearing in the monochrome-signal frequency intervals in the receiver.

8. A television system comprising: a color-television transmitter for transmitting an amplitude-modulated carrier signal including a monochrome-signal component and a frequency-interleaved color-signal component; a television receiver including means exposed to both the monochrome and color-signal components and responsive to the monochrome-signal component for producing a monochrome image, the color-signal frequency intervals being such that the effects of the color-signal component are largely invisible to the human eye, such receiver means also including a nonlinear element which tends to cause spurious color-signal components to appear within the monochrome-signal frequency intervals and thereby be undesirably visible; and apparatus included in the transmitter and including circuit means having a nonlinearity corresponding to that of the nonlinear element in the receiver and responsive to the color signal for generating a nonlinear correction signal and circuit means responsive to the correction signal for modifying the portion of the monochrome signal with which the color signal is to be frequency interleaved to precorrect the monochrome signal to compensate for the spurious color-signal components appearing in the monochrome-signal frequency intervals in the receiver.

9. A television system comprising: a color-television transmitter for transmitting an amplitude-modulated carrier signal including a monochrome-signal component and a frequency-interleaved color-signal component; a television receiver including a monochrome-signal channel for translating the frequency interleaved signal components and a nonlinear image-reproducing device coupled thereto and responsive to the monochrome-signal component for producing a monochrome image, the color-signal frequency intervals being such that the effects of the color-signal component translated by the monochrome-signal channel are largely invisible to the human eye, the nonlinearity of the image-reproducing device tending, however, to cause spurious color-signal components translated by the monochrome signal channel to appear within the monochrome-signal frequency intervals and thereby be undesirably visible in the monochrome portion of the reproduced image; and apparatus included in the transmitter and including circuit means having a nonlinearity corresponding to that of the image-reproducing device in the receiver and responsive to the color signal for generating a nonlinear correction signal and circuit means responsive to the correction signal for modifying the portion of the monochrome signal with which the color signal is to be frequency interleaved to precorrect the monochrome signal to compensate for the spurious color-signal components appearing in the monochrome-signal frequency intervals in the receiver.

10. A television system comprising: a color-television transmitter for transmitting in a vestigial-side-band manner an amplitude-modulated carrier signal including a monochrome-signal component and a frequency-interleaved color-signal component; a television receiver including an envelope detector for detecting the frequency interleaved modulation components and a monochrome-signal channel coupled thereto for supplying these frequency interleaved signal components to a nonlinear image-reproducing device of the receiver, such device being responsive to the monochrome-signal component for producing a monochrome image, the color-signal frequency intervals being such that the effects of the color-signal component translated by the monochrome-signal channel are largely invisible to the human eye, the quadrature distortion produced by the envelope detector and the nonlinearity of the image-reproducing device tending, however, to cause spurious color-signal components translated by the monochrome-signal channel to appear within the monochrome-signal frequency intervals and thereby be undesirably visible in the monochrome portion of the reproduced image; and apparatus included in the transmitter and including circuit means responsive to the color signal for generating a quadrature correction signal, circuit means having a nonlinearity corresponding to that of the image-reproducing device in the receiver and responsive to the color signal for generating a second correction signal, and circuit means responsive to the correction signals for modifying the portion of the monochrome signal with which the color signal is to be frequency interleaved to precorrect the monochrome signal to compensate for the spurious color-signal components appearing in the monochrome-signal frequency intervals in the receiver.

11. Apparatus for use in a color-television transmitter which transmits an amplitude-modulated carrier signal including a monochrome-signal component and a frequency-interleaved color-signal component, the apparatus comprising: circuit means for supplying a monochrome signal; circuit means for supplying a color signal; nonlinear circuit means having a nonlinearity corresponding to the nonlinearity of at least part of the monochrome-signal portion of a television receiver and responsive to the color signal for developing a correction signal; and circuit means responsive to the correction signal for modifying the portion of the monochrome signal with which the color signal is to be frequency interleaved to precorrect the monochrome signal to compensate for spurious color-signal components appearing in the monochrome-signal frequency intervals in the monochrome-signal portion of the television receiver.

12. Apparatus for use in a color-television transmitter which transmits an amplitude-modulated carrier signal including a monochrome-signal component and a frequency-interleaved color-signal component, the apparatus comprising: circuit means for supplying a monochrome video signal; circuit means for supplying a color video signal; nonlinear circuit means having a nonlinearity corresponding to the nonlinearity of at least part of the monochrome-signal portion of a television receiver and responsive to the color video signal for developing a correction signal; circuit means responsive to the correction signal for modifying the portion of the monochrome video signal with which the color signal is to be frequency interleaved to precorrect the monochrome video signal to compensate for spurious color-signal components appearing in the monochrome-signal frequency intervals in the monochrome-signal portion of the television receiver; and circuit means for combining the modified monochrome signal and the color signal in a frequency-interleaved manner and supplying the combined signal to the carrier-signal encoder of the transmitter.

13. Apparatus for use in a transmitter which transmits a modulated carrier signal including a main signal component and a frequency-multiplexed subcarrier signal component, the apparatus comprising: circuit means for supplying a main signal; circuit means for supplying a subcarrier signal; nonlinear circuit means having a nonlinearity corresponding to the nonlinearity of at least part of the main signal portion of a receiver and responsive to the subcarrier signal for developing a correction signal; circuit means responsive to the correction signal for modifying the portion of the main signal with which the subcarrier signal is to be frequency multiplexed to precorrect the main signal to compensate for spurious subcarrier signal components appearing in the main signal frequency range in the main signal portion of the receiver; and circuit means for combining the modified main signal and the subcarrier signal in a frequency-multiplexed manner and supplying the combined signal to the carrier-signal encoder of the transmitter.

14. Apparatus for use in a color-television transmitter which transmits an amplitude-modulated carrier signal including a monochrome-signal component and a frequency-interleaved color subcarrier signal component, the apparatus comprising: circuit means for supplying a monochrome video signal; circuit means for supplying a color subcarrier video signal; nonlinear circuit means having a nonlinearity corresponding to the nonlinearity of at least part of the monochrome-signal portion of a television receiver and responsive to the color subcarrier video signal for developing a correction signal; circuit means responsive to the correction signal for modifying the portion of the monochrome video signal with which the color subcarrier signal is to be frequency interleaved to precorrect the monochrome video signal to compensate for spurious color subcarrier signal components appearing in the monochrome-signal frequency intervals in the monochrome-signal portion of the television receiver; and circuit means for combining the modified monochrome signal and the color subcarrier signal in a frequency-interleaved manner and supplying the combined signal to the carrier-signal encoder of the transmitter.

15. Apparatus for use in a color-television transmitter which transmits an amplitude-modulated carrier signal including a monochrome-signal component and a frequency-interleaved color-signal component, the apparatus comprising: circuit means for supplying a monochrome video signal; circuit means for supplying a color video signal; nonlinear circuit means having a nonlinearity corresponding to the nonlinearity of at least part of the monochrome-signal portion of a television receiver and responsive to the color video signal for developing a correction signal; nonlinear circuit means responsive to the correction signal for modifying the portion of the monochrome video signal with which the color signal is to be frequency interleaved to precorrect the monochrome video signal to compensate for spurious color-signal components appearing in the monochrome-signal frequency intervals in the monochrome-signal portion of the television receiver; and circuit means for combining the modified monochrome signal and the color signal in a frequency-interleaved manner and supplying the combined signal to the carrier-signal encoder of the transmitter.

16. Apparatus for use in a color-television transmitter which transmits an amplitude-modulated carrier signal including a monochrome-signal component and a frequency-interleaved color-signal component, the apparatus comprising: circuit means for supplying a monochrome video signal; circuit means for supplying a color video signal; nonlinear circuit means having a nonlinearity corresponding to the nonlinearity of at least part of the monochrome-signal portion of a television receiver and responsive to the color video signal for developing a correction signal; circuit means including modulator circuit means for translating the monochrome video signal and responsive to the correction signal for modifying the portion of the monochrome video signal with which the color signal is to be frequency interleaved to precorrect the monochrome video signal to compensate for spurious color-signal components appearing in the monochrome-signal frequency intervals in the monochrome-signal portion of the television receiver; and circuit means for combining the modified monochrome signal and the color signal in a frequency-interleaved manner and supplying the combined signal to the carrier-signal encoder of the transmitter.

17. Apparatus for use in a color-television transmitter which transmits an amplitude-modulated carrier signal including a monochrome-signal component and a frequency-interleaved color-signal component, the apparatus comprising: circuit means for supplying a monochrome video signal; circuit means for supplying a color video signal; nonlinear circuit means having a nonlinearity corresponding to the nonlinearity of the image-reproducing device of a television receiver and responsive to the color video signal for developing a correction signal; circuit means responsive to the correction signal for modifying the portion of the monochrome video signal with which the color signal is to be frequency interleaved to precorrect the monochrome video signal to compensate for spurious color-signal components appearing in the monochrome-signal frequency intervals in the monochrome-signal portion of the television receiver; and circuit means for combining the modified monochrome signal and the color signal in a frequency-interleaved manner and supplying the combined signal to the carrier-signal encoder of the transmitter.

18. Apparatus for use in a color-television transmitter which transmits an amplitude-modulated carrier signal including a monochrome-signal component and a frequency-interleaved color-signal component, the apparatus comprising: circuit means for supplying a monochrome video signal; circuit means for squaring the monochrome video signal; circuit means for supplying a color video signal; circuit means for squaring the color video signal; circuit means for modifying the squared monochrome signal in accordance with a factor representative of the squared color signal; circuit means for deriving from the modified monochrome signal a signal representative of the square root thereof thereby to obtain a precorrected monochrome video signal which will compensate for spurious color-signal components appearing in the monochrome-signal frequency intervals in the monochrome-signal portion of a television receiver; and circuit means for combining the precorrected monochrome signal and the color signal in a frequency-interleaved manner and supplying the combined signal to the carrier-signal encoder of the transmitter.

References Cited in the file of this patent

UNITED STATES PATENTS

| | | |
|---|---|---|
| 2,773,930 | Richman | Dec. 11, 1956 |
| 2,951,903 | De Vrijer | Sept. 6, 1960 |